(12) United States Patent
Singh Bawa et al.

(10) Patent No.: US 11,748,575 B2
(45) Date of Patent: Sep. 5, 2023

(54) UTTERANCE RECOMMENDATION IN A CONVERSATIONAL ARTIFICIAL INTELLIGENCE PLATFORM

(71) Applicant: ACCENTURE GLOBAL SOLUTIONS LIMITED, Dublin (IE)

(72) Inventors: Gurpreet Singh Bawa, Gurgaon (IN); Kaustav Pakira, Mumbai (IN); Souvik Chakraborty, Kolkata (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 453 days.

(21) Appl. No.: 17/003,505

(22) Filed: Aug. 26, 2020

(65) Prior Publication Data
US 2022/0067296 A1 Mar. 3, 2022

(51) Int. Cl.
*G06N 5/04* (2023.01)
*G06N 3/08* (2023.01)
*G06F 40/35* (2020.01)
*G06F 40/56* (2020.01)
*G06F 16/9035* (2019.01)
(Continued)

(52) U.S. Cl.
CPC .......... *G06F 40/35* (2020.01); *G06F 16/2457* (2019.01); *G06F 16/24575* (2019.01); *G06F 16/24578* (2019.01); *G06F 16/901* (2019.01); *G06F 16/9035* (2019.01); *G06F 16/90332* (2019.01); *G06F 40/56* (2020.01); *G06N 3/08* (2013.01); *G06N 5/04* (2013.01)

(58) Field of Classification Search
CPC ............ G06F 16/901; G06F 16/90332; G06F 16/9035; G06F 16/24575; G06F 16/24578; G06F 16/2457; G06N 5/04
See application file for complete search history.

(56) References Cited

U.S. PATENT DOCUMENTS

| 10,353,906 B2 | 7/2019 | Souche et al. |
| 2021/0303578 A1* | 9/2021 | Dua .................... G06F 16/2228 |

OTHER PUBLICATIONS

Christian Abbet et al., "Churn Intent Detection in Multilingual Chatbot Conversations and Social Media", Proceedings of the 22nd Conference on Computational Natural Language Learning (CoNLL 2018), pp. 161-170.

(Continued)

*Primary Examiner* — Jay A Morrison
(74) *Attorney, Agent, or Firm* — Mannava & Kang, P.C.

(57) ABSTRACT

An utterance recommendation system may obtain a plurality of utterance influencing attributes influencing a response recommended for a user query from a plurality of sources. The system may collate the utterance influencing attributes to provide enriched user data and may identify a set of preconfigured potential utterance options associated with the user query. The system may implement a plurality of utterance recommendation techniques to analyze the enriched user data based on associated predefined rules, and provide a preferential rank ordering of the preconfigured potential utterance options to be recommended based on the analysis. The system may determine a single optimized rank ordering of the preconfigured potential utterance options representing a ranking order of the preconfigured potential utterance options. The system may provide the response to the user query, based on a potential utterance option ranked highest in the single optimized rank ordering.

19 Claims, 15 Drawing Sheets

(51) Int. Cl.
    *G06F 16/901*     (2019.01)
    *G06F 16/9032*     (2019.01)
    *G06F 16/2457*     (2019.01)

(56) References Cited

OTHER PUBLICATIONS

George Larionov et al., "Tartan: A retrieval-based socialbot powered by a dynamic finite-state machine architecture", 2nd Proceedings of Alexa Prize (Alexa Prize 2018), 17 pages.

\* cited by examiner

450

| Features 455 | VIF 460 | Correlation vs Weekday_Tran_count 470 |
|---|---|---|
| Weekday_Tran_count | 1.40 | 100% |
| meanfreq | 1.43 | 60% |
| Conv_Senti_Score | 1.57 | 55% |
| Comments_given | 1.73 | 40% |
| sdfreq | 1.86 | 33% |
| order_placedby_bot | 2.05 | 45% |
| Total_Tran_Amt | 2.11 | 70% |
| mfcc1 | 3.03 | 18% |
| Minute_Ineraction | 3.11 | 73% |
| Web_visit | 3.26 | 29% |
| Promo_offer_purchase | 3.50 | 35% |
| Debit_Card_Spent | 4.25 | 59% |
| Tier3_Prod_Purchase | 4.38 | 87% |
| Credit_card_spent | 4.61 | 3% |
| freqmedian | 4.83 | 15% |
| Tier1_prod_purchase | 5.28 | 1% |
| Cash_Pay | 5.54 | 23% |
| Prev_Conv_Senti_Score | 5.72 | 67% |
| mfcc2 | 5.76 | 50% |
| last_interaction_bot | 5.76 | 16% |
| Loyalty_cupon_used | 5.92 | 1% |
| Bot_Reco_attribute | 6.24 | 57% |
| Total_Dis_Amt | 6.25 | 49% |
| Bonus_Token_used | 6.32 | 88% |
| Weekeend_Tran_count | 6.41 | 80% |
| bot_rated | 6.58 | 34% |
| Time_Spent_Web | 7.18 | 49% |

| Permutation | D1 | D2 | D3 | Total D | Max D | Variance |
|---|---|---|---|---|---|---|
| 700-1 (2, 4, 1, 3) | 0 | 1 | 3 | 4 | 3 | 2.333333333 |
| 700-2 (3, 4, 1, 2) | 1 | 0 | 4 | 5 | 4 | 4.333333333 |
| 700-3 (2, 3, 1, 4) | 1 | 2 | 2 | 5 | 2 | 0.333333333 |
| 700-4 (3, 2, 1, 4) | 2 | 3 | 1 | 6 | 3 | 1 |
| 700-5 (4, 3, 1, 2) | 2 | 1 | 3 | 6 | 3 | 1 |
| 700-6 (4, 2, 1, 3) | 3 | 2 | 2 | 7 | 3 | 0.333333333 |
| 700-7 (1, 4, 2, 3) | 1 | 2 | 4 | 7 | 4 | 2.333333333 |
| 700-8 (3, 1, 2, 4) | 3 | 4 | 0 | 7 | 4 | 4.333333333 |
| 700-9 (1, 3, 2, 4) | 2 | 3 | 3 | 8 | 3 | 0.333333333 |
| 700-10 (4, 1, 2, 3) | 4 | 3 | 1 | 8 | 4 | 2.333333333 |
| 700-11 (3, 4, 2, 1) | 2 | 1 | 5 | 8 | 5 | 4.333333333 |
| 700-12 (1, 2, 3, 4) | 3 | 4 | 2 | 9 | 4 | 1 |
| 700-13 (4, 3, 2, 1) | 3 | 2 | 4 | 9 | 4 | 1 |
| 700-14 (2, 1, 3, 4) | 4 | 5 | 1 | 10 | 5 | 4.333333333 |
| 700-15 (1, 4, 3, 2) | 2 | 3 | 5 | 10 | 5 | 2.333333333 |
| 700-16 (4, 2, 3, 1) | 4 | 3 | 3 | 10 | 4 | 0.333333333 |
| 700-17 (1, 3, 4, 2) | 3 | 4 | 4 | 11 | 4 | 0.333333333 |
| 700-18 (4, 1, 3, 2) | 5 | 4 | 2 | 11 | 5 | 2.333333333 |
| 700-19 (2, 4, 3, 1) | 3 | 2 | 6 | 11 | 6 | 4.333333333 |
| 700-20 (1, 2, 4, 3) | 4 | 5 | 3 | 12 | 5 | 1 |
| 700-21 (2, 3, 4, 1) | 4 | 3 | 5 | 12 | 5 | 1 |
| 700-22 (2, 1, 4, 3) | 5 | 6 | 2 | 13 | 6 | 4.333333333 |
| 700-23 (3, 2, 4, 1) | 5 | 4 | 4 | 13 | 5 | 0.333333333 |
| 700-24 (3, 1, 4, 2) | 6 | 5 | 3 | 14 | 6 | 2.333333333 |

FIG. 7A

| 711 |  | A | B | C | D | E | F | G |
|---|---|---|---|---|---|---|---|---|
| 715-1 | Select row | A | B | C | D | - | - | - |
|  | Rank | D | A | B | C | - | - | - |
| 715-2 | Select row | - | A | B | C | E | - | - |
|  | Rank | - | E | A | B | C | - | - |
| 715-3 | Select row | - | - | A | B | C | F | - |
|  | Rank | - | - | F | A | B | C | - |
| 715-4 | Select row | - | - | - | A | B | C | G |
|  | Rank | - | - | - | A | B | C | G |

| 731 | Select | row | B | C | D | A | - | - | - |
|---|---|---|---|---|---|---|---|---|---|
| 735-1 | Select | row | B | C | D | A | - | - | - |
| | | Rank | B | C | D | A | - | - | - |
| 735-2 | Select | row | - | C | D | A | E | - | - |
| | | Rank | - | C | D | A | E | - | - |
| 735-3 | Select | row | - | - | D | A | E | F | - |
| | | Rank | - | - | D | A | E | F | - |
| 735-4 | Select | row | - | - | - | A | E | F | G |
| | | Rank | - | - | - | A | E | F | G |

| Utterance Options | Possible Combinations (Ordinal Approach) | Possible Combinations (Bootstrap Approach) |
|---|---|---|
| 1 | NA | NA |
| 2 | 2 | 2 |
| 3 | 6 | 6 |
| 4 | 24 | 24 |
| 5 | 120 | 240 |
| 6 | 720 | 432 |
| 7 | 5040 | 672 |
| 8 | 40,320 | 960 |
| 9 | 362,880 | 1296 |
| 10 | 3,628,800 | 1680 |
| 11 | 39,916,800 | 2112 |
| 12 | 479,001,600 | 2592 |
| 13 | 6,227,020,800 | 3120 |
| 14 | 87,178,291,200 | 3696 |
| 15 | 1,307,674,368,000 | 4320 |

```
Obtaining a plurality of utterance influencing attributes influencing a response
recommended for a user query from a plurality of sources 902
                            ↓
Collating the plurality of utterance influencing attributes to provide enriched user
data 904
                            ↓
Identifying a set of preconfigured potential utterance options associated with the
user query 906
                            ↓
Implementing a plurality of utterance recommendation techniques to analyze the
enriched user data 908
                            ↓
Analyzing the enriched data based on predefined rules associated with each
utterance recommendation technique 910
                            ↓
Based on the analysis, providing a preferential rank ordering of the preconfigured
potential utterance options to be recommended by each utterance recommendation
technique 912
                            ↓
                           (A)
```

FIG. 9A

UTTERANCE RECOMMENDATION IN A CONVERSATIONAL ARTIFICIAL INTELLIGENCE PLATFORM

BACKGROUND

Conversational Artificial Intelligence (AI) is a set of technologies that enables people to communicate with computer-based information systems in everyday human-like natural language. The conversational AI is typically used with automated messaging and speech enabled applications to offer human-like interactions between computers and humans. This is achieved by understanding speech and text, comprehending a user's intent, interpreting different languages, and generating responses in a manner that mimics human conversations. The automated messaging and speech enabled applications may implement chat bots, call bots, voice bots, and virtual assistants that enable communication with applications, websites and devices via voice, text, touch, or gesture input.

The automated messaging and speech enabled applications were created to replace human representatives in order to reduce human service costs and time, involved in attending to customer grievances. In conventional automated messaging and speech enabled applications, conversational AI platforms enable human-like interactions between chat/voice bots and users, based on queries from the users and pre-set responses to the queries. Conventional utterance recommendation systems use conversational AI platforms to provide utterance recommendations to the chatbots. Utterance recommendations may be understood as responses recommended to be provided to a user in relation to the user's query via a chatbot.

While conventional utterance recommendation systems may be able to handle user interactions that follow a predicted path, these systems fail to make the interaction contextually personalized for the user. This may occur, for instance, when a conversation deviates from a predefined path. In addition, conventional utterance recommendation systems may be unable to handle complex queries and may only handle first-level or preliminary questions such as, for example, frequently asked questions. Furthermore, a majority of existing utterance recommendation systems provide recommendations that are unidirectional, i.e., they cater to only one kind of data such as, for example, either transactional or utterance behavior.

Accordingly, a technical problem with the currently available utterance recommendation systems is that they provide static responses and only cater to unidirectional data. In addition, conventional utterance recommendation systems lack the intelligence to make decisions if an interaction deviates from a predicted path. Therefore, there is a need for an utterance recommendation system that captures micro moments (i.e., nuances of moments) within a flow of interaction between a user and a bot, and consequently makes the interaction contextually personalized to the user. In addition, there is a need for an utterance recommendation system that fine tunes the otherwise static bot responses by providing dynamic utterance recommendations.

BRIEF DESCRIPTION OF DRAWINGS

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIGS. 4A and 4B illustrate an example implementation of a data enricher of the system of FIG. 2, according to an example embodiment of the present disclosure.

FIGS. 7A-7E illustrate an example implementation of the utterance recommendation system for providing an utterance recommendation, according to an example embodiment of the present disclosure.

FIGS. 9A and 9B illustrate a process flowchart for providing utterance recommendation, according to an example embodiment of the present disclosure.

DETAILED DESCRIPTION

Figure 1:
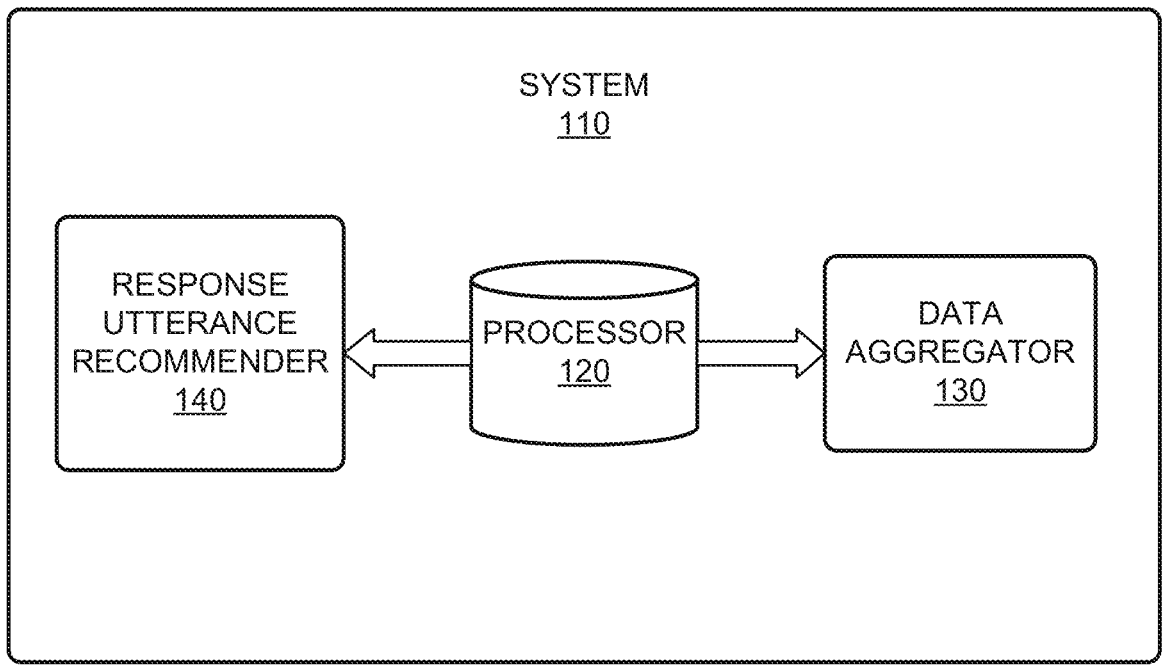
FIG. 1 illustrates a block diagram for an utterance recommendation system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes a system and method for providing utterance recommendations in a conversational artificial intelligence (AI) platform. The utterance recommendation system (referred to as "system" hereinafter) may be used to provide a response to a user query. The system may provide a single optimized dynamic utterance recommendation for an ongoing interaction between a virtual agent and a user, based on data from multiple sources, such as external data sources, user portfolio data, and user profile data. The present system may integrate social, emotional or demographical cues associated the user along with the ongoing conversation, the user portfolio data, and the user profile data, to provide optimized utterance recommendations. The user portfolio data may include transactional information of the user, and the user profile data may include information such as spending patterns, historical data associated with the user, and a method of communication preferred by the user. Consequently, the present system provides for improvising personalization levels to an extent which help reinforcing a belief in users that they are having human-like interactions.

The system of present disclosure may include, among other components, a processor, and a response utterance recommender coupled to the processor. The processor may be coupled to the response utterance recommender and the data aggregator. The response utterance recommender may provide a response to a user query. The response utterance recommender may include a data enricher, a multi-fold solution recommender, and a parallel consensus aggregator.

The data enricher may obtain a plurality of utterance influencing attributes and collate the plurality of utterance influencing attributes to provide enriched user data. The utterance influencing attributes may be parameters or aspects of data associated with a user or a user environment that may influence the response recommended for the user query. In an embodiment, utterance influencing attributes may include data associated with user preferences, prior user interactions, user sentiments and user demographics. For example, the utterance influencing attributes may be based on a user's age, spending habits, prior requests, and prior issues etc.

The multi-fold solution recommender may identify a set of preconfigured potential utterance options associated with the user query. The multi-fold solution recommender may then implement a plurality of utterance recommendation techniques to analyze the enriched user data. An utterance recommendation technique may analyze the enriched data based on predefined rules associated with the utterance recommendation technique. The utterance recommendation technique, based on the analysis, may then provide a preferential rank ordering of the preconfigured potential utterance options to be recommended for resolving the user query.

The parallel consensus aggregator may receive a plurality of preferential rank orderings of the preconfigured potential utterance options. The plurality of preferential rank orderings may include the preferential rank ordering of the preconfigured potential utterance options provided by each of the plurality of the utterance recommendation techniques. The parallel consensus aggregator may then determine a single optimized rank ordering of the preconfigured potential utterance options with a minimum final disagreement index among the plurality of preferential rank orderings. The minimum final disagreement index may be indicative of a maximum consensus among the preferential rank orderings computed using various recommendation techniques. In an example, the minimum final disagreement index may be based on a disagreement index determined for each pair of potential; utterance options in a preferential rank ordering. The single optimized rank ordering may represent an optimized ranking order of the preconfigured potential utterance options, which is generated based on consensus among the rank ordering determined using multiple recommendation techniques. The parallel consensus aggregator may then provide the response to the user query, based on a potential utterance option ranked highest in the single optimized rank ordering.

The embodiments for the utterance recommendation system herein are exemplary in nature and should be treated as such. For the sake of brevity and technical clarity, the description of utterance recommendation system may be restricted to few exemplary embodiments, however, to a person of ordinary skill in the art, it should be clear that the system may be used for the fulfillment of various utterance recommendation requirements other than those mentioned hereinafter.

The present disclosure aims to provide an utterance recommendation system that may account for the various factors mentioned above, amongst others, to provide multi-faceted personalized utterance recommendation in an efficient and accurate manner. Furthermore, the present disclosure may provide fine-tuned dynamic utterance recommendations by combining data, such as ongoing conversation related data, the external data, the user portfolio data, and the user profile data, and by implementing various machine learning techniques, AI techniques, and deep neural network techniques on the combined data in a scalable and an efficient manner.

FIG. 1 illustrates an utterance recommendation system 110 (referred to as system 110 hereinafter. An utterance recommendation may be understood as a response that is recommended by the system 110 to a virtual agent associated with the system 110, which in turn may be provided to a user to resolve a query. The virtual agent may be a digital application associated with the utterance recommendation system 110 to mimic a human agent to interact with users. The virtual agent may be any of a chat bot, call bot, voice bot, and a digital assistant/virtual assistant.

In an example embodiment, a user may interact with the virtual agent associated with the system 110 to seek a response to a query, and the system 110 may intelligently process various types of data associated with the user to provide an appropriate utterance recommendation to the virtual agent. The virtual agent may use the utterance recommendation to provide the response to the user. The system 110 may include, for example, a processor 120 coupled to a data aggregator 130 and a response utterance recommender 140.

The data aggregator 130 may generate a user profile, based on information obtained from at least one of the user's current interactions with the virtual agent and previous recommendations provided to the user. When the user interacts with the virtual agent, the virtual agent may obtain information from an ongoing interaction including a current sentiment of the user, current behavioral preference, a communication method preferred by the user, information related to current transactions carried out by the user, demographic information of the user and the like. The information obtained from the ongoing interaction may be stored in the user profile as historical data for future interactions. In addition, the information related to previous conversation intent of the user as well as previous recommendations provided to the user are also stored in the user profile.

The information from the ongoing interaction obtained by the data aggregator 130, the historical data from the user's user profile and data related to external factors may be used by the response utterance recommender 140 to obtain a plurality of utterance influencing attributes. The data related to external factors may include data related to a current season, current promotions, a current scenario, such as outbreak of a disease, or a natural calamity. The data from the multiple sources, such as the user profile data, the user portfolio data, and the external data sources may be used determine the utterance influencing attributes. Unstructured data, which may be in audio, text, or any other format, from multiple sources may be used to determine the utterance influencing attributes. The utterance influencing attributes may be used by the response utterance recommender 140 to determine an appropriate response to the user's query.

The response utterance recommender 140 may generate the enriched user data based on the utterance influencing attributes. Data enrichment may refer to aggregating multi-dimensional information from a plurality of data sources and merging that information with existing data to enhance the existing data for use in determining an utterance recommendation. Because the information is gathered from multiple sources, the collected data is multi-dimensional as against traditional systems, where the data may be unidirectional, i.e., information gathered from a single source. The multi-dimensional information may include transactional, behavioral and portfolio information related to the user. The response utterance recommender 140 may analyze the enriched user data by implementing the plurality of utterance recommendation techniques to preferentially rank the set of preconfigured potential utterance options. The potential utterance options may be pre-configured responses already available with the system 110 for interacting with the user. The response utterance recommender 140 may then determine the single optimized rank ordering representing the ranking order of the preconfigured potential utterance options and may provide the response to the user query based on the potential utterance option ranked highest in the single optimized rank ordering. Details pertaining to various other components are provided with respect to subsequent figures.

Figure 2:
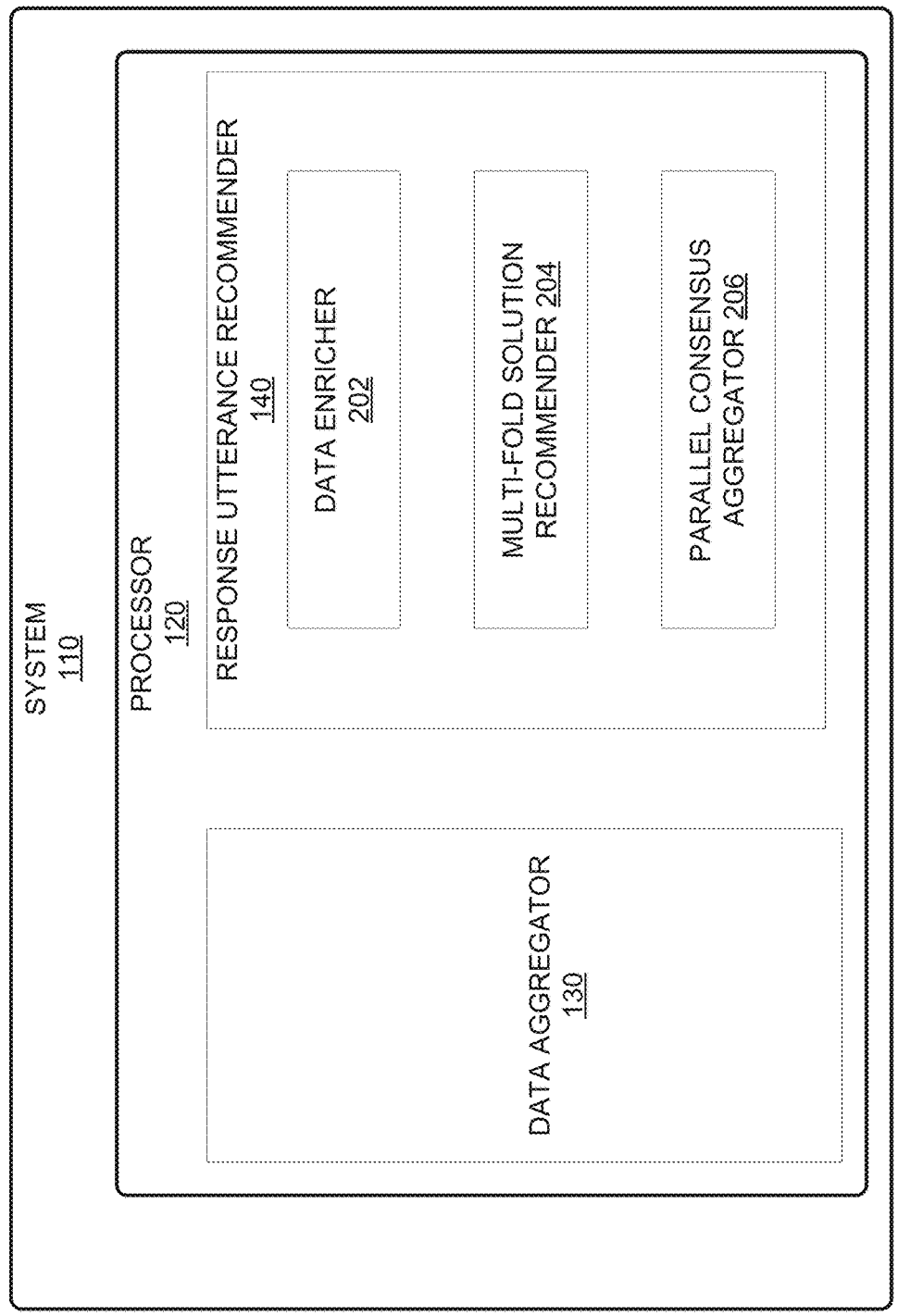
FIG. 2 illustrates various components of the utterance recommendation system, according to an example embodiment of the present disclosure.

Referring to FIG. 2, various components of the system 110 are illustrated, particularly the components of the response utterance recommender 140, according to an example embodiment of the present disclosure. The response utterance recommender 140 may include a data enricher 202, a multi-fold solution recommender 204, and a parallel consensus aggregator 206. The data enricher 202 may obtain the utterance influencing attributes influencing the response recommended for the user query, from a plurality of sources. The plurality of sources may include at least one of the external data source and the user data. In an example, the user data may include the user portfolio data and the user profile data, and the external data source may include the user demographics, seasonal indicators (such as pandemic, cyclone etc.).

The data from the external data source may be first aggregated at a transactional level type and then used at a user level type. It will be appreciated that data may include information or records indicative of various level types, such as record indicative of a transaction and a record indicative of a user name. In an example, obtained data may be eventually aggregated at a user level, i.e., each record being unique to one user. For example, in order to obtain unique user portfolio data and user profile data for the user, data related to user transactions may be first aggregated and associated with the user, followed by aggregation and association of the user data with the user. The user portfolio data may include the transactional information of the users. In an embodiment, at least one utterance influencing attribute may be obtained from the transactional information of the user like purchase and spend patterns of the user, communication channel preferred by the user, time of day or day of week preferred by the user etc. There may be a plurality of user profiles and corresponding user profile data. The user profile data may include the sentiment score, interaction intent of the user, previous recommendations, and existing interaction data.

The user sentiment may be reaction of the user to a service, product or recommendation, and the sentiment score may be a measure of that reaction. The sentiment may be identified from the user's ongoing interaction as positive, negative, or neutral. A pre-set value may be assigned to various sentiment polarities to obtain the sentiment score. In an embodiment, sentiment analysis techniques may be used to obtain the sentiment score. For example, a natural language toolkit (NLTK) package may be used to obtain the sentiment score.

Thus, the data from the external data source, the user portfolio data, and the user profile data may be used to obtain the utterance influencing attributes, based on the user demographic data, the seasonal indicator, the transaction data, the sentiment score, the interaction intent and the like. The utterance influencing attributes may be key performance indicators (KPIs) based on the purchase and spend patterns of the user, the communication channel preferred by the user, the time of day or day of week preferred by the user, the sentiment score etc. For example, the utterance influencing attributes may include a weekday transaction count, a weekend transaction count, a total transaction amount, last interaction time and the like.

The data enricher 202 may collate the plurality of utterance influencing attributes to provide the enriched user data. The enriched data may be obtained by collating information specific to each user from the plurality of sources. The utterance influencing attributes may be then mapped to each user and a variable clustering and multi-collinearity analysis may be performed on the data to identify and reconcile highly correlated utterance influencing attributes. In an example, variable clustering may be used to form a cluster of highly correlated utterance influencing attributes, i.e., variables with a high correlation between them may be sorted into the same cluster. Further, the multi-collinearity analysis is performed by way of a variance inflation factor (VIF) score of the utterance influencing attributes, which indicates how much variability of a variable, i.e., an utterance attribute can be explained by the other utterance attributes in a dataset.

In an embodiment, there may be no pre-determined rules on how much data can be included for analysis, which makes the flexibility of including as much information possible from the plurality of sources. The system 110 may then perform standard data reconciliation to help identify and remove redundant utterance influencing attributes.

The data enricher 202 may perform variable correlation analysis to determine an association between the utterance influencing attributes in the cluster and the variance inflation factor (VIF) score for each of the utterance influencing attributes in the cluster. The VIF score for an utterance influencing attribute may indicate an extent of variability explainable by a linear combination of other utterance influencing attributes in the cluster. An utterance influencing attribute having a high VIF score may be less likely to be selected for further analysis, because high VIF score may indicate that the utterance influencing attribute in question has maximum correlation with other utterance influencing attributes, i.e., the utterance influencing attribute in question may be ignored without considerable loss of information. Therefore, VIF scores may help in filtering out highly correlated utterance influencing attributes. Accordingly, the data enricher 202 may select the utterance influencing attributes, based on the VIF scores and the selected utterance influencing attributes may be collated to provide the enriched data. Details related to the utterance influencing attributes and corresponding VIF scores are explained in detail with reference to description of FIG. 4B.

The data enricher 202 may quantify the unstructured data by extracting the utterance influencing attributes from the unstructured data. For example, the data enricher 202 may map the utterance influencing attributes using mel-frequency cepstral coefficients (MFCC) and acoustic coefficient techniques. MFCC technique may be used to quantify a sound wave spectrum for an audio data and obtain coefficients representing numerical values corresponding to the audio data. In an embodiment, in case of textual data, the utterance influencing attributes may be extracted with the help of term frequency-inverse document frequency (TFIDF) analysis. The TFIDF analysis may be used to obtain numerical values for words from the textual data, wherein a numerical value provides a measure of frequency and a specificity of a word in the textual data. For example, the data enricher 202 may obtain the utterance influencing attributes with high specificity by using TFIDF analysis to identify frequently used key words from the ongoing interaction. The data enricher 202 may then combine the plurality of utterance influencing attributes to provide the enriched data.

The multi-fold solution recommender 204 may generate multi-fold utterance recommendations based on the enriched data. In an example, a set of potential utterance options may be available to be used by the virtual agent for providing the response to the user query. These potential utterance options may be a set of responses suitable to specific user queries. The potential utterance options may be pre-stored and may be dynamically updated by the system 110, based on a self-learning mechanism that may be implemented using machine learning techniques.

The multi-fold solution recommender 204 may identify the set of preconfigured potential utterance options associated with the user query and implement the plurality of utterance recommendation techniques to analyze the enriched user data. The utterance recommendation techniques analyze the enriched data based on the predefined rules associated with the utterance recommendation techniques and provide the preferential rank orderings of the preconfigured potential utterance options to be recommended. It will be appreciated that each technique may have certain rules or logic for determining an outcome, i.e., rank orderings and these rules may be implemented, when a technique is used.

The utterance recommendation techniques may be based on one of the deep neural network techniques and the machine learning techniques. The machine learning technique may include one of an orthogonal vector based recommendation technique and a collaborative filtering recommendation technique. The orthogonal vector based recommendation technique may divide the potential utterance options based on the enriched data, and may load the potential utterance options in different orthogonal vectors leading to recommendations. This approach is further explained with the help of FIG. 5.

The parallel consensus aggregator 206 may receive the plurality of preferential rank orderings of the preconfigured potential utterance options, and determine the single optimized rank ordering of the preconfigured potential utterance options representing the ranking order of the preconfigured potential utterance options. The parallel consensus aggregator 206 may then, based on the potential utterance option ranked highest in the single optimized rank ordering, provide the response to the user query. The parallel consensus aggregator 206 may use parallel consensus aggregation to combine the plurality of preferential rank orderings of the preconfigured potential utterance options. The plurality of preferential rank orderings may include the preferential rank ordering of the preconfigured potential utterance options provided by each of the plurality of the utterance recommendation techniques.

In an embodiment, the single optimized rank ordering of the preconfigured potential utterance options may be determined based on the minimum final disagreement with the plurality of preferential rank orderings. The disagreement may be a measure of dissimilarity in ranking of the at least two preconfigured potential utterance options represented by two rank orderings. The minimum final disagreement may be the lowest measure of dissimilarity obtained by calculating pair-wise dissimilarities between the plurality of preferential rank orderings.

The parallel consensus aggregator 206 may identify a set of potential ranking order permutations, based on a number of preconfigured potential utterance options. For example, if there are three potential utterance options, then there will be 6 possible ranking order permutations. It will be appreciated that the plurality of preferential rank orderings, which are determined by the multi-fold solution recommender 204, would belong to the set of the potential ranking order permutations. The parallel consensus aggregator 206 may then determine a disagreement index between each potential ranking order in the set of potential ranking order permutations with respect to each of the plurality of preferential rank orderings. For each potential ranking order, the parallel consensus aggregator 206 may determine the pair-wise disagreement index of ranking between each pair of the preconfigured potential utterance options, and compute the disagreement index based on corresponding one or more pair-wise disagreement index.

The parallel consensus aggregator 206 may then compute a final disagreement index for each potential ranking order in the set of potential ranking order permutations. The final disagreement index may be computed based on the disagreement index determined with respect to each of the plurality of preferential rank orderings. The preferential rank ordering with the minimum final disagreement index as the single optimized rank ordering of the preconfigured potential utterance options, may be provided by the parallel consensus aggregator 206. The parallel consensus aggregator 206 is explained further with the help of FIG. 6 and FIGS. 7A-E.

As different outcomes from the multi-fold solution recommender 204 may provide different preferential rank ordering, the parallel consensus aggregator 206 is required to provide an optimized rank ordering which adequately represents all the rankings with maximum agreement. To achieve this, the parallel consensus aggregator 206 may use an ordinal distance based approach between rankings which results in the best representative ordering of the potential utterance options. A second bootstrap approach may then be used as a wrapper on the ordinal distance based approach to achieve better time complexity. This may lead to faster responses by the virtual agent. In order to maintain sanity in provided responses, context of the interaction between the virtual agent and the user, previous recommendations/responses provided to the user, and sentiment score from the data aggregator 130 may be compared and the single optimized rank ordering may be obtained. The single optimized rank ordering may promote suggestions to select a best ranked potential utterance option which is more relevant with respect to the user query, thereby providing a personalized utterance recommendation.

For example, in the interaction between the user and a bank's chatbot, where the user is complaining about a fee charged for exceeding the credit limit on his credit card, the system 110 ensures that the user is not provided with an utterance recommendation i.e., response to apply for a similar type of product (credit card) even though it may not have been recommended to the user before. The system 110 may instead provide a response suggesting the user to upgrade his product to a credit card with increased credit limit to avoid future charges. The best ranked potential utterance option i.e., the recommendation, may be provided to the data aggregator 130 for future interactions and sanity checks. The data aggregator 130 may store the recommendation in a respective user profile.

Figure 3:
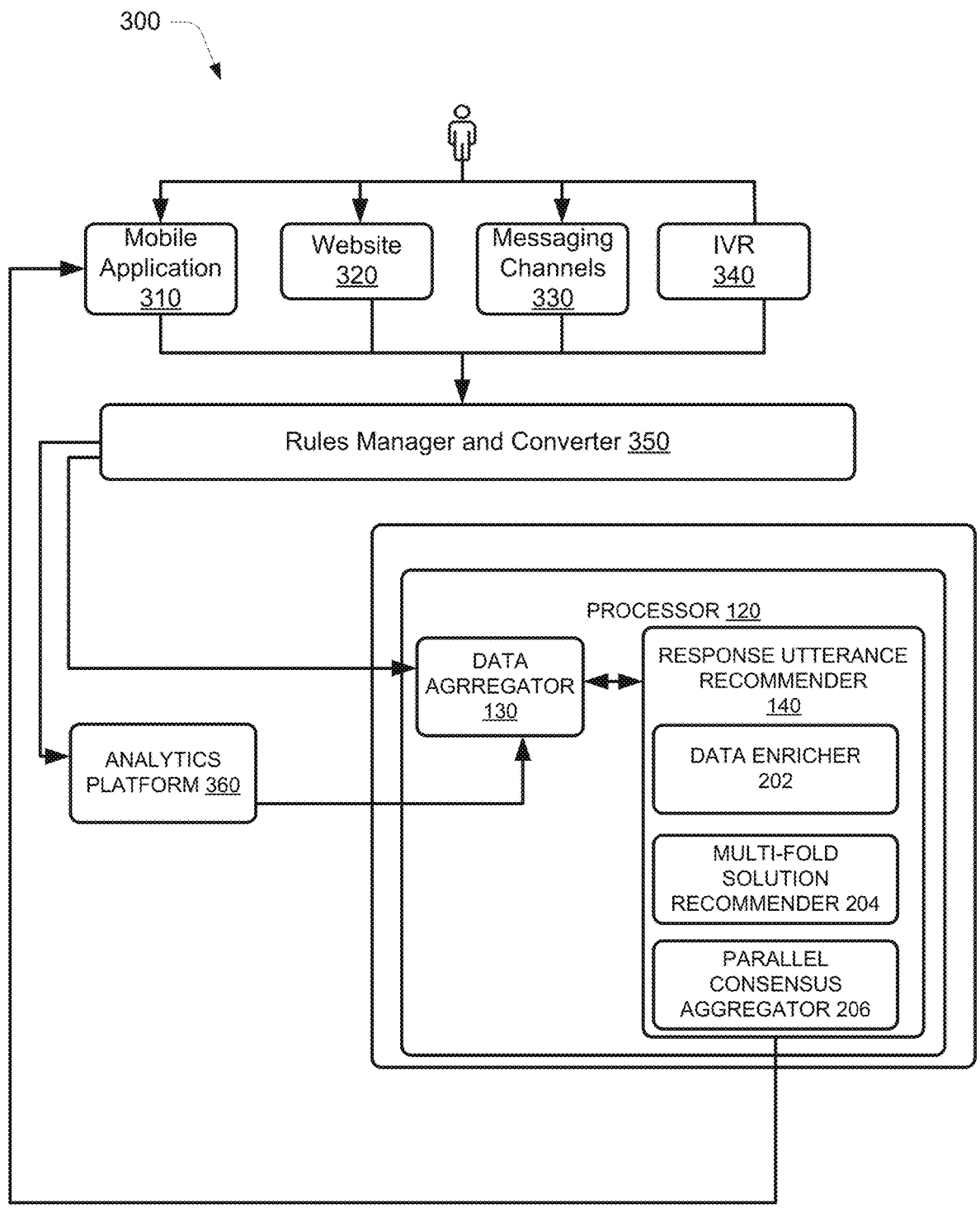
FIG. 3 illustrates a schematic diagram for implementation of the utterance recommendation system, according to an example embodiment of the present disclosure.

FIG. 3 illustrates a schematic diagram 300 for implementation of the system 110, according to an example embodiment of the present disclosure. In an example, the user may interact with the virtual agent cooperating with the system 110 to obtain the response to the query. The system 110 may analyze the interaction to provide the suitable response to the query. In order to analyze the interaction and provide response, the system 110 may gather information associated with the user. The data aggregator 130 may obtain the information from various virtual agents via one or more communication channels, such as, for example, a mobile application 310, a website 320, messaging channels 330, and an interactive voice response channel (IVR) 340. For example, in case of a bank, the user may interact with a bank's virtual agent, for example, the bank's chatbot, through a banking application by using his mobile device, or by using a bank website, or other messaging options, or by contacting a customer care department of the bank. Data obtained from the user during this interaction may be in different formats. For example, the data can be in audio format if the user is calling the customer care department, whereas the data can be in a textual format if the user is using the website to chat with the bank's chatbot. This data is converted to a pre-determined format, for instance, based on a level type at which data is data is desired by a rules manager and converter 350. For instance, the data at various level types, also referred to as a level, may be rolled up or collated a single level. For example, the rules manager and converter 350 may convert data in audio format and textual format to obtain corresponding numerical values, and these numerical values may be used for further processing. In an embodiment, the rules manager and converter 350 may include configurable rules that enable conversion of data based on future processing requirements. The converted data is then provided to the data aggregator 130 and an analytics platform 360 for further processing. In an embodiment, the system 110 may include the analytics platform 360.

In an example, the rules manager and converter 350 may also provide the set of preconfigured potential utterance options to the multi-fold solution recommender 204 based on a user query. For each user query type, there may be a set of preconfigured utterance options. Based on an analysis, such as using natural language processing and/or speech to text analysis, a query type may be determined and accordingly corresponding options may be identified.

The data aggregator 130 may generate the user profile and the user portfolio based on the converted data received from the rules manager and converter 350. The user profile may contain the demographic data corresponding to the users, and the user portfolio may contain the transactional user data. In an embodiment, if the system 110 is used by a financial institution like a bank, the users will be customers using banking services. The user profile may include previous interaction data, and historical demographic data like user's age, education, income, and the user portfolio may include historical transactional data including transaction history, accounts held, products used and the like. The transaction history may include transaction frequency, transaction day/time, in-person or online transaction and the like. The products may include banking products credit card, loan, insurance, mortgage and the like. It will be appreciated that such details may also be saved in other cases as well, for example, when the user is a customer of an ecommerce portal or a retail shop.

The data aggregator 130 may obtain the external data from the virtual agent interacting with the user. The virtual agent may be a digital assistant with automated chat interfaces (e.g. chat bots). The user profile, the user portfolio and the external data is stored by the data aggregator 130. The data aggregator 130 may include a repository (not shown) to store the user profiles. In an embodiment, the user profile, user portfolio and the external data may be stored in an external server (not shown). The server may include the repository.

The analytics platform 360 may analyze the converted data and identify the interaction intent of the user. The analytics platform 360 may use a natural language understanding platform like DialogFlow to analyze the converted data. The interaction intent may refer to an objective for which the user is interacting with the virtual agent. For example, if the user, while interacting with the virtual agent, provides the information that he is looking for home buying options, the analytics platform 360 will analyze this information to identify 'mortgage' as the interaction intent.

In an embodiment, the analytics platform 360 may use a customer analytical record (CAR) and/or a journey analytics record (JAR) along with pre-built dashboards to identify the interaction intent. The customer analytical record may include a customer record indicating complete information related to the user at a user level type, for example, the user profile data and the user portfolio data, and the journey analytics record may include a journey record indicating a complete interaction journey of the user. For example, the user is a customer of the bank and contacts the bank via the bank's chatbot, by using a chat window from the website of the bank. The user may have a query related to a fee charged on his credit card. In this scenario, the analytics platform 360 analyzes the text (information) from the chat to identify key words, such as fee, charge, credit card etc., and identifies the interaction intent of the user. The interaction intent may be provided to the data aggregator 130 and stored in a corresponding user profile for further processing. The data from the ongoing interaction may be analyzed to quantify an average sentiment score or a qualitative mood indicator of the user.

The response utterance recommender 140 uses the interaction intent, data from the ongoing interaction, the external data, the user portfolio data, the user profile data, and a plurality of machine learning and recommendation techniques to obtain the personalized utterance recommendation for the virtual agent. The response utterance recommender 140 comprises the data enricher 202, the multi-fold solution recommender 204, and the parallel consensus aggregator 206. The data enricher 204 may obtain data associated with the user, for instance, from the repository or the server to generate the enriched data. The enriched data may be generated by extracting multiple utterance influencing attributes from the data obtained from the plurality of sources, and by collating the multiple utterance influencing attributes as explained above.

The data enricher 204 may use the enriched data to aid in providing an organic flow to the conversation by utilizing the interaction intent to provide dynamic responses specific to the intent. The data enricher 204 may focus on enriching existing data from the user profile with additional information based on the ongoing interaction, past recommendations and the like. The data enrichment may refer to merging data from external sources with existing data to enhance the existing data. The enriched data may be obtained by incorporating the data from the external data source, the user portfolio data, and the user profile data as explained above. The enriched data may include structured and unstructured data components.

Figure 4A:
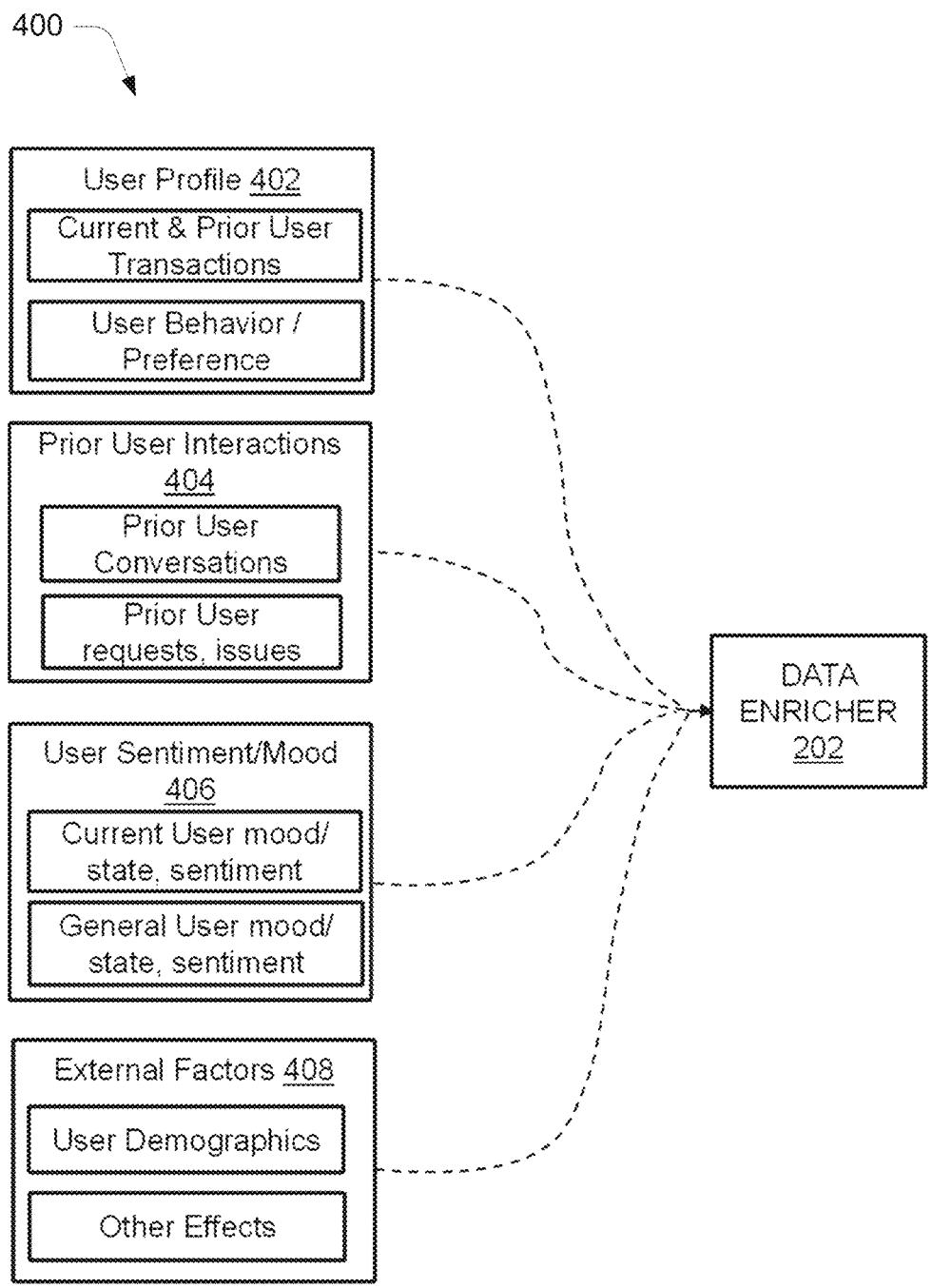

FIG. 4A illustrates an example 400 of the plurality of sources that may be used to determine the plurality of utterance influencing attributes, according to an embodiment of the present disclosure. The data enricher 202 determines the plurality of utterance influencing attributes based on the data from the plurality of sources. The plurality of utterance influencing attributes may be determined by using the data from a user profile 402, prior user interactions 404, user sentiment/mood 406 and external factor 408. The user profile 402 may include current and prior user transactions, and user behavior and preference. The user behavior may include information related to spending habits of the user and the user's preference, for example, information on whether the user is a big spender, whether the user prefers digital transactions, whether the user prefers IVR interactions and the like.

The prior user interactions 404 may include prior user conversations and prior user requests/issues, for example, a prior user interaction related to an FAQ about a credit card, or an interaction related to debit card failure. The prior user interactions 404 of a user may be stored in a user profile 402 and may indicate query patterns of the user. The User sentiment/mood 406 may include current user mood, state and sentiment and general user mood, state and sentiment. For example, if the prior conversation was related to FAQ, the sentiment was on a neutral level, or if there was negative sentiment for some ongoing issue like credit card failure etc.

The user sentiment 406 may be obtained by the analytics platform 360 by analyzing the converted data. The external factors 408 may include the user demographics and other effects. The user demographics may include age group of the user, educational information of the user, etc., and other effects may include impacts due a current situation or a seasonal impact, that might affect user's mood, state and sentiment, for example, a holiday season or a pandemic situation.

The external factors 408 may be obtained by the analytics platform 360. TABLE 1 illustrates the data obtained from the plurality of sources that may be processed by the data enricher 202 to obtain the enriched data, according to an embodiment of the present disclosure.

TABLE 1

| user id | trans-action count | spend amount | channel | FAQ type | complaint type | senti-ment polarity | age group | seasonal indicator |
|---|---|---|---|---|---|---|---|---|
| abc15 | 4 | 250 | web chat | Mortgage | debit card failure | −0.27 | 20-30 | covid |
| scdfrv | 12 | 1350 | app | Loan | mortgage deferral | 0.05 | 40-50 | covid |
| gfvs7s | 4 | 500 | app | Mortgage | atm cash withdrawal | 0.56 | 30-40 | null |
| xwv78 | 2 | 60 | web chat | Documents | incorrect verification | −0.44 | 20-30 | null |
| i82cs | 3 | 180 | call | account details | MPIN | 0.01 | 20-30 | null |
| rvr53d | 6 | 650 | call | credit card | PIN change | 0.83 | 20-30 | covid |
| tw4ow | 8 | 1000 | call | current account | mortgage deferral | −0.16 | 50-60 | covid |
| sd20cl | 19 | 2400 | web chat | account details | MPIN | −0.64 | 50-60 | null |

Referring to TABLE 1, the data from the plurality of sources may be used to identify plurality of utterance influencing attributes like a transaction count, a spend amount, a channel, an FAQ type, a complaint type, a sentiment score, an age group, and a seasonal indicator. The enriched data may be obtained by collating the plurality of utterance influencing attributes thereby facilitating the system 110 to produce an organic and personalized response to a user's query.

FIG. 4B illustrates a table 450 showing correlation between the plurality of utterance influencing attributes, referred to as features 455, obtained from the plurality of sources, according to an example of the present disclosure. The correlation 460 may provide an association between the plurality of utterance influencing attributes. The utterance influencing attributes having a high correlation score may represent most analogous utterance influencing attributes. These attributes may be utilized for further processing. Further, the variance inflation factor (VIF) score 465 which reflects multi-collinearity between the utterance influencing attributes may also be determined. The VIF score of an utterance influencing attribute represents how much variability can be explained by the linear combination of other utterance influencing attributes. An utterance influencing attribute with a higher VIF score is less likely to get selected in a final analysis as it signifies greater correlation of with other utterance influencing attributes. The VIF score helps reduce dimensionality, which is represented by the variables in the dataset for efficient analysis.

The VIF score may be obtained by:

$$VIF(j) = \frac{1}{1 - R_j^2}$$

where, VIF (j) is the VIF score of j-th utterance influencing attribute, and $R_j^2$ is the proportion of variability explained of j-th utterance influencing attribute with respect to the other utterance influencing attributes, i.e., explained variability divided by total variability.

The VIF scores help in selection and collation of the plurality of utterance influencing attributes to obtain the enriched data. In an embodiment, cut-off used for the VIF score may be 5, i.e., the utterance influencing attributes having the VIF score above 5 will not be selected for future analysis. The cut-off for the VIF score may vary depending on an analysis technique used. The plurality of utterance influencing attributes are selected and provided to the data enricher 202 for further processing by the multi-fold recommender 204.

Figure 5:
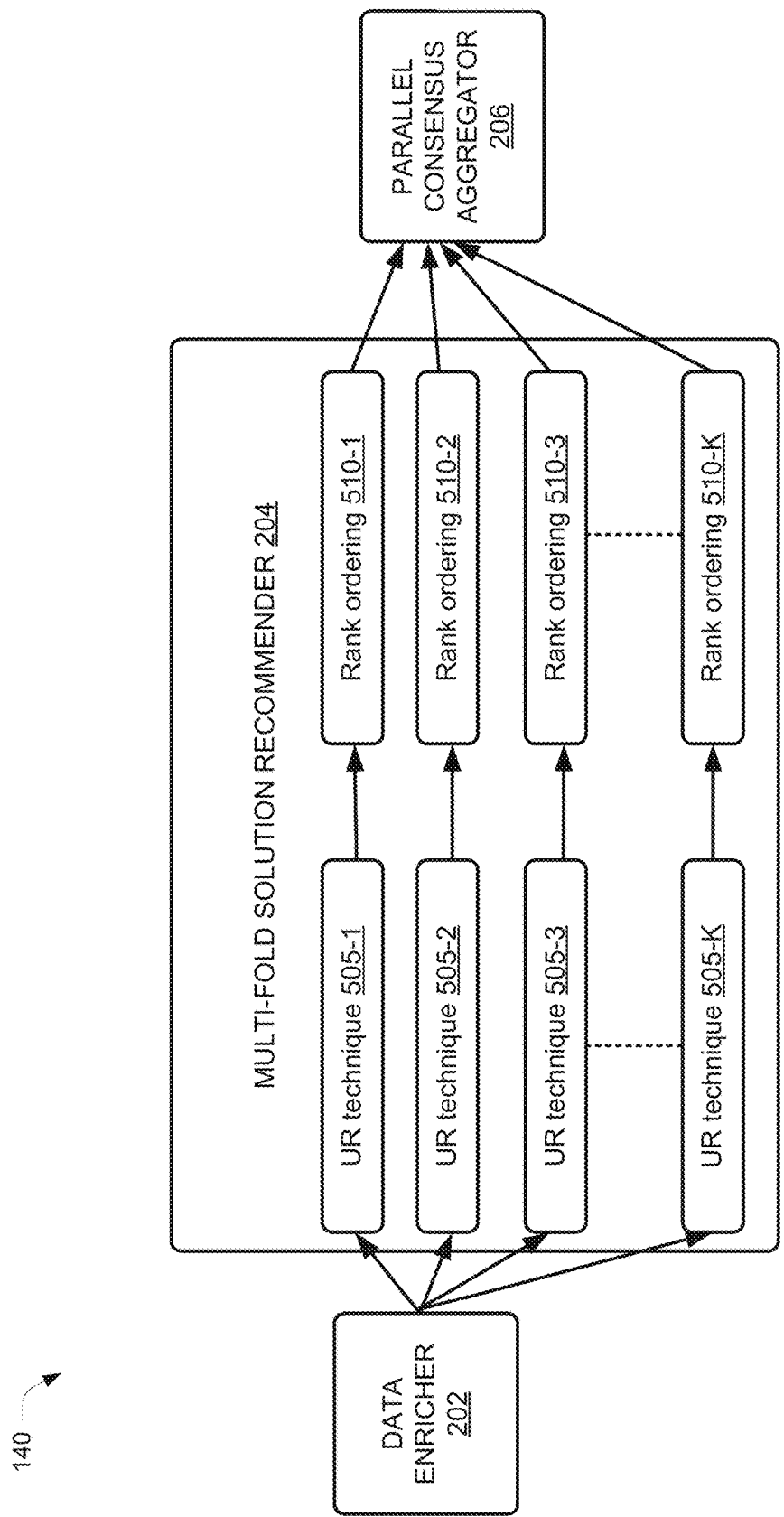
FIGS. 5 and 6 illustrate various components of a response utterance recommender of the system of FIG. 1, according to various example embodiments of the present disclosure.

FIG. 5 schematically illustrates the response utterance recommender 140, according to an example embodiment of the present disclosure. As mentioned earlier, the data enricher 202 provides the enriched data, which may be used by the multi-fold recommender 204 along with the set of preconfigured potential utterance options to provide preferential rank orderings of the preconfigured potential utterance options. The multi-fold solution recommender 204 may identify the set of preconfigured potential utterance options associated with the user query. In an example, the multi-fold solution recommender 204 may obtain the set of preconfigured potential utterance options based on the user query, from the rules manager and converter 350. Further, the multi-fold solution recommender 204 may determine the plurality of utterance recommendation techniques to be used. The plurality of utterance recommendation techniques may be predefined in the system 110. Using each of the plurality of utterance recommendation techniques, the enriched data may be analyzed and a preferential rank ordering of the preconfigured potential utterance options to be recommended may be provided.

In an example, the multi-fold solution recommender 204 implements 'k' different utterance recommendation techniques to provide 'k' preferential rank orderings of the preconfigured potential utterance options. The multi-fold solution recommender 204 may use the enriched data from the data enricher 202 to implement the 'k' different utterance recommendation (UR) techniques 505-1, 505-2, 505-3 . . . 505-k. The multi-fold solution recommender 204 may use any of machine learning techniques, deep learning techniques, orthogonal vector based techniques, and collaborative filtering techniques to provide 'k' different preferential rank orderings of the potential utterance options 510-1, 510-2, 510-3 . . . 510-k. The deep learning based recommendation techniques may construct multiple neural networks in parallel, resulting in key performance indicator clusters (KPI clusters) that may be used as the interaction intent to provide the personalized utterance recommendation. The orthogonal vector based recommendation techniques may divide variability of entire data into different KPIs, and loads the KPIs in different orthogonal vectors to provide the personalized utterance recommendations.

The functioning of the multi-fold recommender 204 may be understood with help of an example. Consider there are four potential utterance recommendation options, viz. Option A (Utter generic Response), Option B (Add Credit Care cross-sell offer), Option C (Add personal loan up-sell offer), and Option D (Switch channels of conversation). The multi-fold solution recommender 204 uses a first recommendation technique, say, a deep learning technique to provide recommendation 505-1 with rank ordering 510-1, which may be represented as 510-1:2>4>1>3. This means that in the rank ordering obtained by using the first recommendation technique, Option B is the most suitable next response followed by D, A, and C. A second recommendation technique, such as, an orthogonal vector based technique may be implemented to provide recommendation 505-2 with rank ordering 510-2, which may be represent as 510-2:3>4>1>2. This means that in the rank ordering obtained by using the second recommendation technique, Option C is most suitable next response, followed by D, A, and B). A third recommendation technique, such as, a collaborative filtering technique may be used to provide recommendation 505-3 with rank ordering 510-3, which may be represented as 510-3:3>1>2>4. This means that in the rank ordering obtained by using the third recommendation technique, Option C is the most suitable next response followed by A, B, and D).

These three different preferential rank orderings of the four potential utterance recommendation options may be combined to obtain an optimal consensus by the parallel consensus aggregator 206. Thus, the multi-fold solution recommender 204 may include 'k' slots for 'k' different utterance recommendations. Each slot may use the enriched data from the data enricher 202 and produce 'k' separate preferential rank orderings, which are provided to the parallel consensus aggregator 206.

Thus, the multi-fold solution recommender 204 provides for implementing multiple recommendation techniques, where each technique may have its own advantages. For instance, the deep learning techniques achieve higher accuracy, the orthogonal vector based techniques help in capturing vectorized positional relationship between the KPIs, and the collaborative filtering techniques cover the aspect of lookalike superimposition with other similar users. The multi-fold solution recommender 204 combines different techniques and uses techniques concurrently on multi-source enriched data, taking care of variations from multiple different data sources.

The 'k' preferential rank orderings of the preconfigured potential utterance options may be provided to the parallel consensus aggregator 206, which may aggregate the 'k' preferential rank orderings to obtain a single optimized rank ordering of the preconfigured potential utterance options. A response to the user query is then obtained by the parallel consensus aggregator 206 based on a potential utterance option ranked highest in the single optimized rank ordering to facilitate dynamic human-like interaction between the dialogue agent and the user. In an example, there may be a fixed set of potential utterance recommendation options, out of which one option is required to be selected and prompted to the virtual agent. The utterance recommender 140 may provide an optimized and personalized utterance recommendation which enables the virtual agent to mimic human-like interactions.

Figure 6:
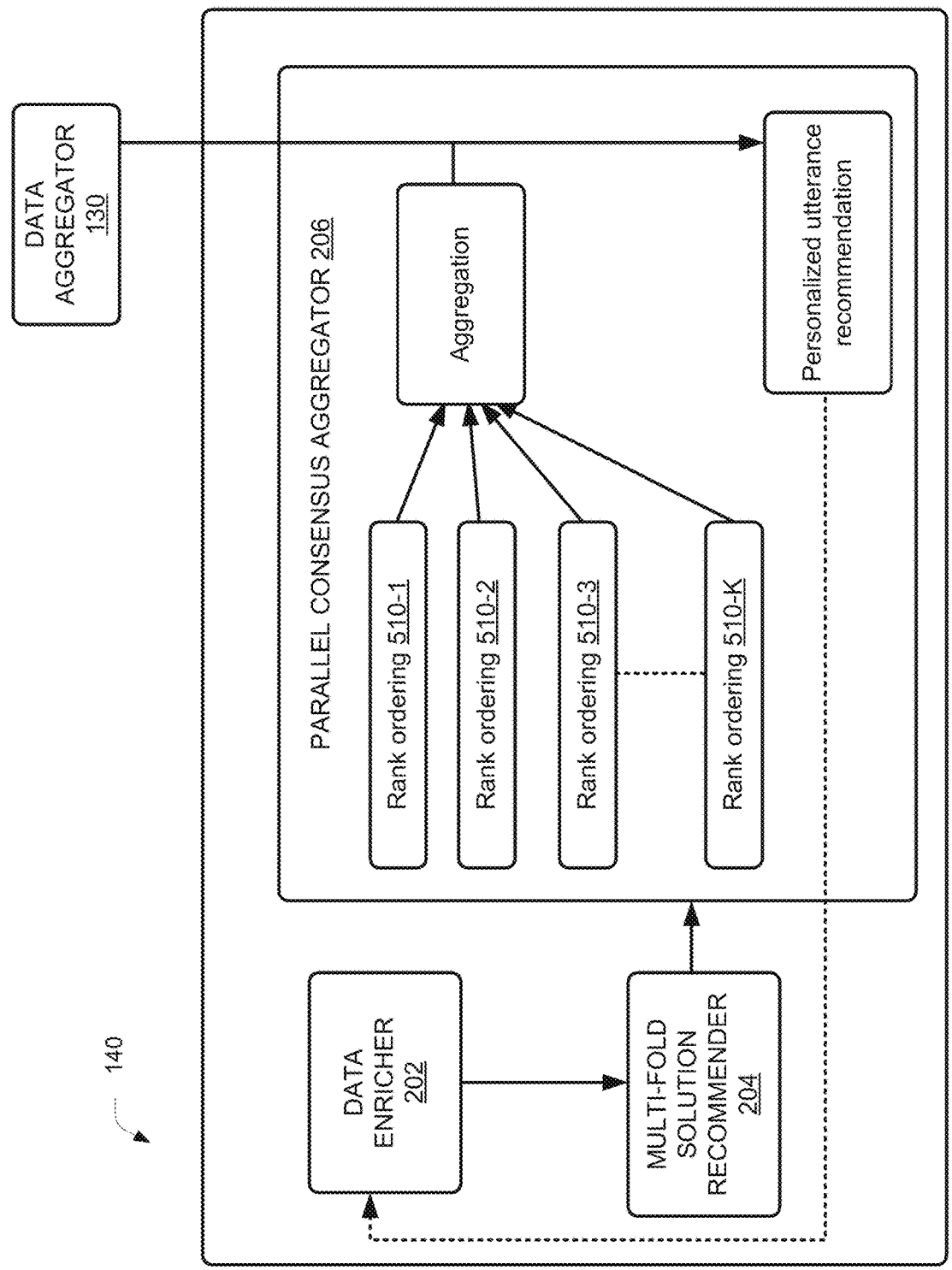

FIG. 6 schematically illustrates functioning 600 of the parallel consensus aggregator 206, according to an example embodiment of the present disclosure. As mentioned earlier, preferential rank orderings 510-1, 510-2, 510-3 . . . 510-k may be obtained from the multi-fold solution recommender 204. The parallel consensus aggregator 206 may utilize the preferential rank orderings 510-1, 510-2, 510-3 . . . 510-k to obtain the single optimized rank ordering representing the ranking order of the preconfigured potential utterance options. The parallel consensus aggregator 206 may use parallel consensus aggregation 605 to combine all the 'k' preferential rank orderings of the potential utterance options into a single rank ordering which is in consensus with all the 'k' preferential rank orderings with a minimum disagreement or maximum agreement. The single optimized rank ordering rank is used to provide a personalize utterance recommendation 610, as will be explained in detail below.

In the example discussed above, there are four utterance recommendation options to be ranked, to obtain a single rank ordering with optimal consensus, i.e., the single optimized rank ordering, belonging to the set of permutations of 1, 2, 3, 4 assuming that no ties exist. The parallel consensus aggregator 206 may obtain the single optimized rank ordering for the 'k' preferential rank orderings by comparing the disagreement between each of the permutations. For example, potential utterance options A, B, C, D in the preferential rank orderings 510-1 are ranked as 2>4>1>3 (where, A is ranked 2, B is ranked 4, C is ranked 1, and D is ranked 3), and the potential utterance options in the preferential rank ordering 510-2 are ranked as 3>4>1>2 (i.e., A is ranked 3, B is ranked 4, C is ranked 1, and D is ranked 2). This is illustrated in TABLE 2 below.

TABLE 2

| Outcome 1 | | | | Outcome 2 | | | |
|---|---|---|---|---|---|---|---|
| A | B | C | D | A | B | C | D |
| 2 | 4 | 1 | 3 | 3 | 4 | 1 | 2 |

To determine a disagreement between these two preferential rank orderings 510-1 and 510-2, the parallel consensus aggregator 206 analyzes each pair of the potential utterance options and their directional agreement. Considering pair (A, B), in the preferential rank orderings 510-1, A is preferred over B and it is same for the preferential rank orderings 510-2, i.e., in the preferential rank orderings 510-2 as well, A is preferred over B. This indicates that for pair AB, the preferential rank orderings 510-1 and 510-2 are in agreement. However, when all pairs of the potential utterance options (i.e., potential utterance options A, B, C, D) are combined, it can be observed that there is a disagreement in case of A and D, i.e., in the preferential rank orderings 510-1, A is preferred over D, but, in the preferential rank orderings 510-2, D is preferred over A, indicating that for pair AD, the preferential rank orderings 510-1 and 510-2 are in disagreement. Now, considering the value of 'k' as 3 (since 3 recommendation techniques are used to provide 3 preferential rank orderings), a comparison table showing disagreement index values between all possible permutations of ranking the four potential utterance options with respect to the three preferential rank orderings 510-1, 510-2 and 510-3 is illustrated in FIG. 7A.

In table 700 of the FIG. 7A, column 'Permutation' denotes the set of potential ranking order permutations for the available potential utterance options. Therefore, for four potential utterance options and three recommendation techniques, there are 24 potential ranking order permutations 700-1 to 700-24 in which the four potential utterance options may be ranked. As mentioned earlier, the rank orderings determined by the various recommendation techniques would for a part of the set of permutations 700-1 . . . -700-24. Columns D1, D2, and D3 denote disagreement index values i.e., number of disagreements between a potential ranking order permutation and the preferential rank orderings. So, column D1 denotes number of pair-wise disagreements between the potential ranking order permutation and the preferential rank ordering 510-1, D2 denotes number of pair-wise disagreements between potential ranking order permutations and the preferential rank ordering 510-2, and D3 denotes number of pair-wise disagreements between the potential ranking order permutations and the preferential rank ordering 510-3.

Referring to the table 700, a disagreement index D1 for the potential ranking order permutation 700-1 (2, 4, 1, 3), is 0, as the preferential rank ordering 510-1 has same rank ordering 2, 4, 1, 3 as the first potential ranking order permutation 700-1. Similarly, a disagreement index D2 for the potential ranking order permutation 700-1 is 1, as there is 1 disagreement between the potential ranking order permutation 700-1 (2, 4, 1, 3) and the preferential rank ordering 510-2 (also indicated by 700-2 in table 700) which is 3, 4, 1, 2. The disagreement in this case is between pair (A, D) as explained earlier.

Similarly, a disagreement index D3 for the potential ranking order permutation 700-1 is 3, as there are 3 disagreements between the potential ranking order permutation 700-1 (2, 4, 1, 3) and the preferential rank ordering 510-3 which is 3, 1, 2, 4. A final disagreement index 'Total D' for the potential ranking order permutation 700-1 denotes total number of disagreements, i.e., sum of all disagreement indexes D1, D2 and D3, and a maximum disagreement 'Max D' denotes number of maximum disagreements, i.e., maximum disagreement index from D1, D2, and D3, which in this case is 3, with respect to the potential ranking order permutation 700-1. 'Variance' is obtained by:

$$\frac{\sum (D_n - \bar{D})^2}{k - 1}$$

where, $D_n$ is value of disagreement of outcome n; D is mean value of all disagreements; and k is the number of outcomes.

The table 700 has been arranged in an ascending order for values of the final disagreement index. Thus, as the potential ranking order permutation 700-1 which is 2, 4, 1, 3 has the minimum final disagreement index and therefore most consensus agreement, it is the single optimized rank ordering of the potential utterance options A, B, C, D. This denotes that the potential ranking order permutation 700-1 provides optimally ranked utterance recommendation options (2, 4, 1, 3 in this case). Therefore, in this case, an optimal utterance recommendation solution, i.e., the single optimized rank ordering is Option C, followed by A, D, and B.

The above-define approach of calculating the minimum final disagreement and therefore most consensus agreement, may be referred to as ordinal distance-based approach. Lower values of the disagreement index or mismatches indicate that the potential ranking order permutations are similar to the preferential rank orderings. If two or more potential ranking order permutations have same minimum final disagreement index value, a potential ranking order permutation with lesser variance or lesser maximum disagreement (Max D) may be considered to be the optimal consensus aggregation i.e., the single optimized rank ordering, with assumption that lower variance causes more stability.

If all metrics, i.e., the final disagreement index, the maximum disagreement index, and the variance for two or more potential ranking order permutations are the same, any of the potential ranking order permutation can be considered to be optimal. So, with reference to the table 700 in FIG. 7A, the potential ranking order permutations 700-6 which is 4, 2, 1, 3, 700-7 which is 1, 4, 2, 3, and 700-8 which is 3, 1, 2, 4 have same final disagreement index, but, potential ranking order permutation 700-6 which is 4, 2, 1, 3 may be considered to be optimal as it has least variance. Further, in case of the potential ranking order permutations 700-20 which is 1, 2, 4, 3 and 700-21 which is 2, 3, 4, 1, where all metrics are same, any of the potential ranking order permutations 700-20 (1, 2, 4, 3) and 700-21 (2, 3, 4, 1) may be considered to be optimal.

Figure 7C:

A higher number of potential utterance options may result in increased computational complexity. In order to overcome this problem, the parallel consensus aggregator 206 may use a bootstrap approach as a wrapper on the ordinal distance-based approach. The bootstrap approach provides better time complexity, leading to faster optimized utterance recommendations. In this approach, for an example, even if 7 potential utterance options are available, only 4 potential utterance options may be analyzed iteratively at a time. FIGS. 7B-7D illustrate tables 710-730 showing multiple iterations carried out in the bootstrap approach. Referring to table 710, A-G are 7 potential utterance options that need to be ranked in order of optimal consensus, i.e., the single optimized rank ordering must be obtained based on the 7 potential utterance options. Out of these 7 potential utterance options A-G only 4 potential utterance options A-D are analyzed at a time i.e., in one iteration, using the previously disclosed ordinal distance-based approach. A best ranked potential utterance option out of the 4 potential utterance options is then discarded and a next potential utterance option is added.

For example, referring to table 710, during a first iteration 711, in a 1st step 715-1, only the potential utterance options A-D are analyzed using the ordinal distance-based approach. Considering that the potential utterance option D is the best ranked potential option, it will be discarded and the potential utterance option E will be added to the remaining potential utterance options. So, the ordinal distance-based approach will be now used to analyze the potential utterance options A, B, C and E in a 2nd step 715-2. In this step, if the potential utterance option E is the best ranked potential option, it will be removed and next the next potential utterance option F will be added for analysis, and so on. Thus, by using the bootstrap approach as a wrapper on the ordinal distance-based approach, it is possible to obtain the single optimized rank ordering for high number of potential utterance options. In this example, a preferential rank ordering (D, E, F, A, B, C, G) is obtained in the first iteration 711.

If the number of potential utterance options is 'z' and a chosen step size value is 'n', then, every iteration will have z−n+1 steps. When in an iteration, these z−n+1 steps end, an output preferential rank ordering, which is output obtained after the iteration is considered as an input preferential rank ordering for next iteration. This process is repeated until the output preferential rank ordering matches the input preferential rank ordering.

Considering the same example, 'z' is 7 and 'n' is 4, so, every iteration may include 4 steps. For example, FIG. 7B, table 710 illustrates the first iteration 711 having 4 steps 715-1, 715-2, 715-3, and 715-4, FIG. 7C, table 720 illustrates a second iteration 721 having 4 steps 725-1, 725-2, 725-3, and 725-4, and FIG. 7D, table 730 illustrates a fifth iteration 731 having 4 steps 735-1, 735-2, 735-3, and 735-4. Once the 4 steps 715-1, 715-2, 715-3 and 715-4 are completed, for an input preferential rank ordering (A, B, C, D, E, F, F), the output preferential rank ordering (D, E, F, A, B, C, G) is obtained in the first iteration 711 (illustrated in table 710), this output preferential rank ordering is provided as the input preferential rank ordering for the second iteration 721 illustrated in FIG. 7C, table 720. This process continues till the fifth iteration 731 illustrated in table 730.

In the fifth iteration 731, illustrated in table 730, the input preferential rank ordering (B, C, D, A, E, F, G) matches the output preferential rank ordering. Thus, in this example, for 7 potential utterance options, five iterations are required to obtain the single optimized rank ordering of the preconfigured potential utterance options, (which, in this example means that option B has optimal consensus i.e., option B is the best utterance recommendation followed by options C, D, A, E, F, and G.

In an example, if the ordinal distance-based approach is considered to analyze 7 preconfigured potential utterance options, there will be 7! (=5040) different potential ranking order permutations. However, if the bootstrap approach is considered with a step size 4, to analyze 7 preconfigured potential utterance options, each step size of 4 options will involve 4! or 24 potential ranking order permutations and each iteration will include 4 (=7−4+1) steps. Therefore, to obtain the single optimized rank ordering, there will be 24*4*7=672 possible comparisons. In this calculation, 7 is an upper bound value by Levenshtein distance between two potential ranking order permutations when the preferential rank ordering is completely reversed. In the example considered above, a convergence (i.e. when the input preferential rank orderings match the output preferential rank orderings) is attained after 5 iterations, i.e., 24*4*5=480 comparisons instead of 5040 potential ranking order permutations.

FIG. 7E illustrates a table 740 showing relative comparison of computational complexity between an ordinal distance-based approach and a bootstrap approach for obtaining the single optimized rank ordering, according to an example embodiment of the present disclosure. The step size is 4 in this example. As it is evident from the table 740, in the bootstrap approach, if the potential utterance options are less than or equal to 4, both approaches require same number of steps/permutations to obtain the single optimized rank ordering. When there are 5 potential utterance options, the ordinal approach requires a fewer number of steps, whereas, when the potential utterance options are 6, both approaches are comparable.

However, as the number of potential utterance options goes on increasing, it can be observed that the computational burden of the ordinal approach increases exponentially, whereas the bootstrap approach outperforms the ordinal approach. In an embodiment, there may be a fixed set of potential utterance options, out of which a highest ranked potential utterance option is required to be identified and prompted to the virtual agent. The system 110 may provide an optimized and personalized utterance recommendation based on the highest ranked potential, thereby enabling the virtual agent to mimic human-like interactions.

Figure 8:
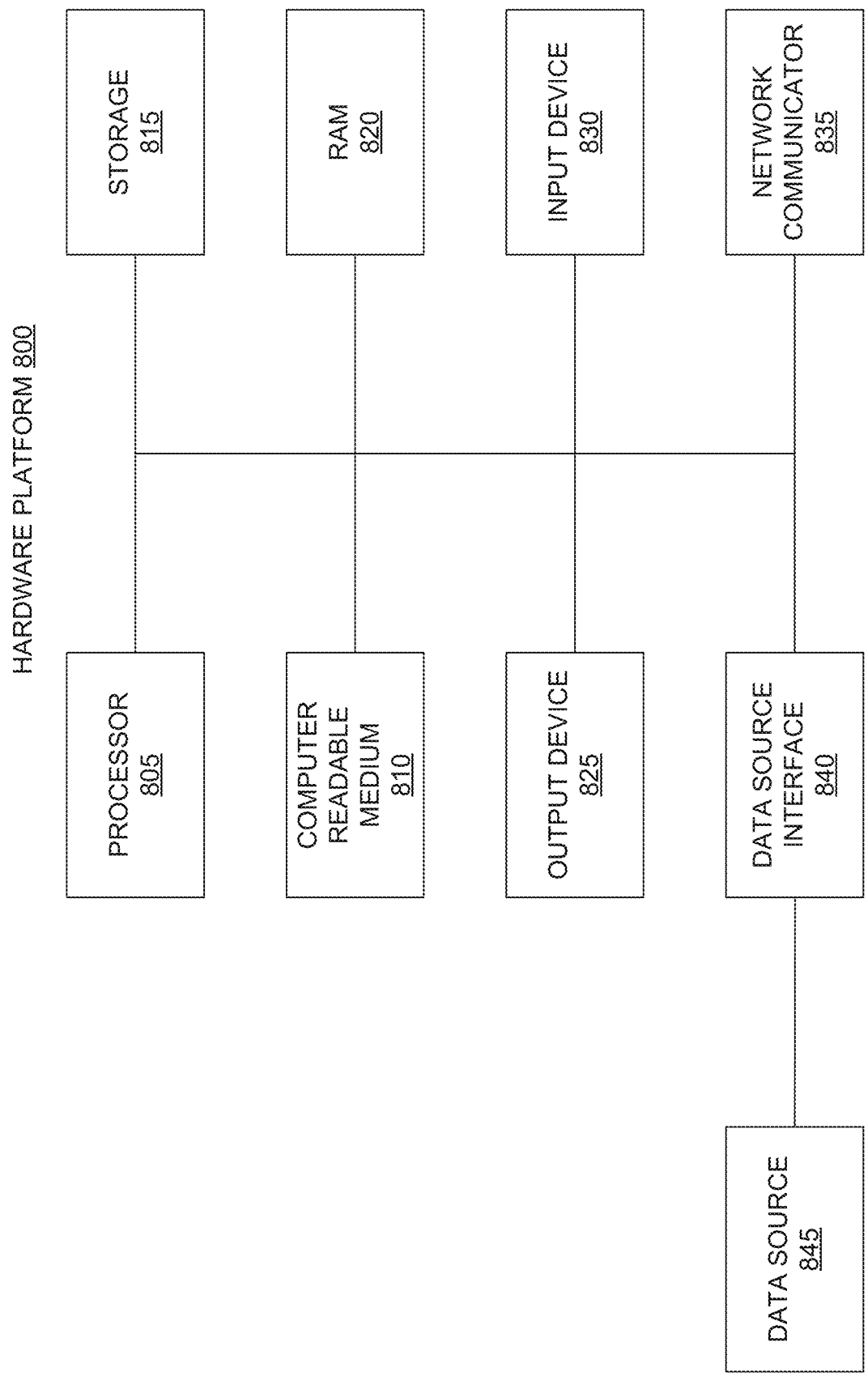
FIG. 8 illustrates a hardware platform for the implementation of the utterance recommendation system, according to an example embodiment of the present disclosure.

Referring to FIG. 8, the hardware platform 800 may be a computer system 800 that may be used with the examples described herein. The computer system 800 may represent a computational platform that includes components that may be in a server or another computer system. The computer system 800 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 800 may include a processor 805 that executes software instructions or code stored on a non-transitory computer-readable storage medium 810 to perform methods of the present disclosure. The software code includes, for example, instructions to gather user data and analyze the user data. In an example, the data aggregator 130, and the utterance recommender 140 may use the software codes.

The instructions on the computer-readable storage medium 810 are read and stored the instructions in storage 815 or in random access memory (RAM) 820. The storage 815 provides a large space for keeping static data where at least some instructions could be stored for later execution. The stored instructions may be further compiled to generate other representations of the instructions and dynamically stored in the RAM 820. The processor 805 reads instructions from the RAM 820 and performs actions as instructed.

The computer system 800 further includes an output device 825 to provide at least some of the results of the execution as output including, but not limited to, visual information to users, such as external agents. The output device 825 can include a display on computing devices and virtual reality glasses. For example, the display can be a mobile phone screen or a laptop screen. GUIs and/or text are presented as an output on the display screen. The computer system 800 further includes an input device 830 to provide a user or another device with mechanisms for entering data and/or otherwise interact with the computer system 800. The input device 830 may include, for example, a keyboard, a keypad, a mouse, or a touchscreen. Each of these output devices 825 and input devices 830 could be joined by one or more additional peripherals. In an example, the output device 825 may be used to display an utterance recommendation.

A network communicator 835 may be provided to connect the computer system 800 to a network and in turn to other devices connected to the network including other clients, servers, data stores, and interfaces, for instance. A network communicator 835 may include, for example, a network adapter such as a LAN adapter or a wireless adapter. The computer system 800 includes a data source interface 840 to access data source 845. A data source is an information resource. As an example, a database of exceptions and rules may be a data source. Moreover, knowledge repositories and curated data may be other examples of data sources.

Figure 9B:
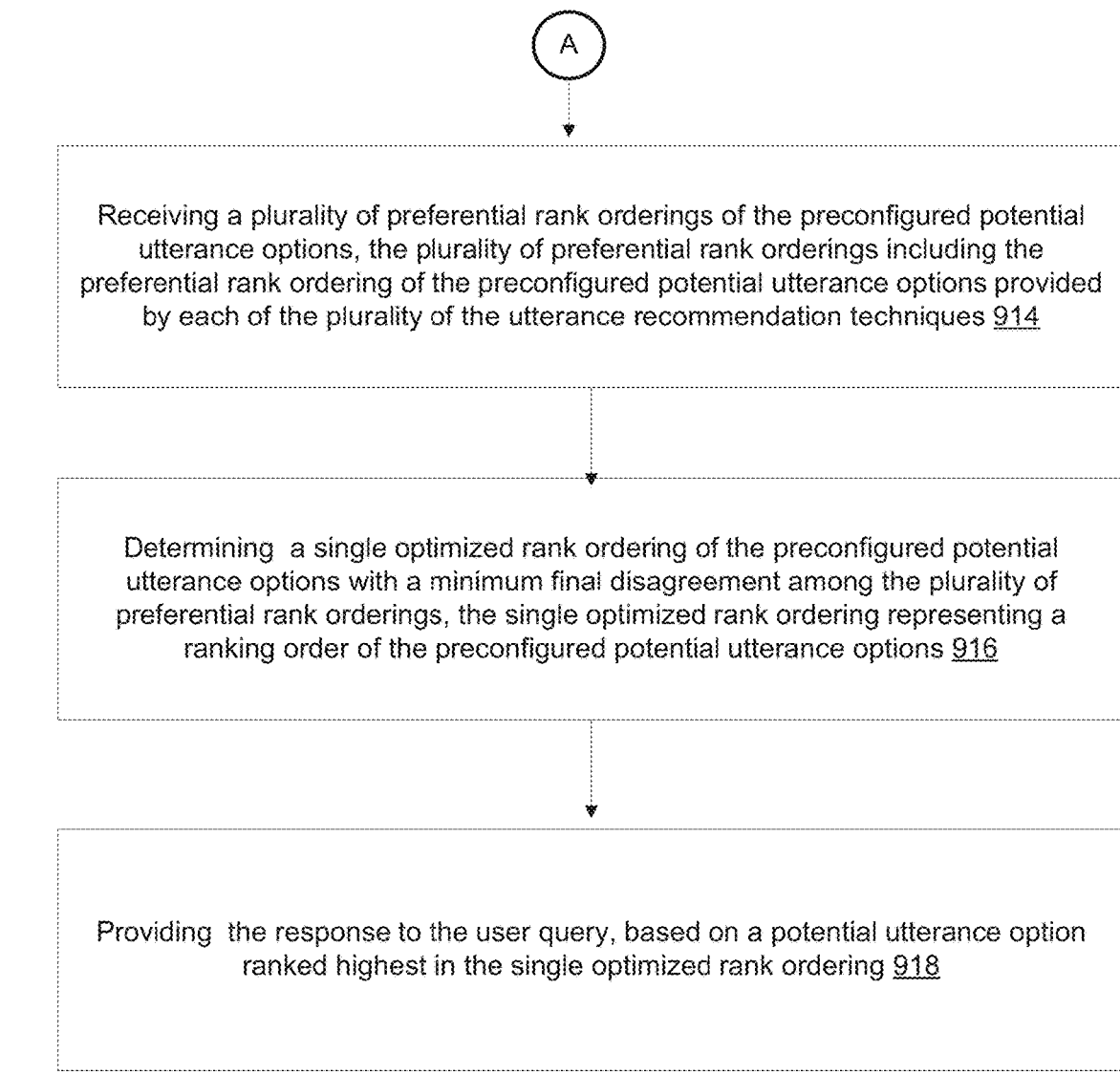

FIGS. 9A and 9B illustrate a process flowchart for providing utterance recommendation, according to an example embodiment of the present disclosure.

It should be understood that method steps are shown here for reference only and other combinations of the steps may be possible. Further, the method 900 may contain some steps in addition to the steps shown in FIGS. 9A and 9B. For the sake of brevity, construction and operational features of the system 110 which are explained in detail in the description of FIGS. 1-8 are not explained in detail in the description of FIGS. 9A and 9B. The method 900 may be performed by a component of the system 110, such as the processor 120, the data aggregator 130, the response utterance recommender 140, the data enricher 202, the multi-fold solution recommender 204, and the parallel consensus aggregator 206.

At block 902, a plurality of utterance influencing attributes influencing a response recommended for a user query from a plurality of sources, may be obtained. In an example, the data enricher 202 may obtain the plurality of utterance influencing attributes from the plurality of sources.

At block 904, the plurality of utterance influencing attributes may be collated to provide enriched user data. In an example, the data enricher 202 may provide the enriched data by collating the plurality of utterance influencing attributes.

At block 906, a set of preconfigured potential utterance options associated with the user query may be identified. In an example, the multi-fold solution recommender 204 may identify the set of preconfigured potential utterance options.

At block 908, a plurality of utterance recommendation techniques may be implemented to analyze the enriched user data. In an example, the multi-fold solution recommender 204 may implement the utterance recommendation techniques.

At block 910, the enriched data may be analyzed based on predefined rules associated with an utterance recommendation technique. In an example, the multi-fold solution recommender 204 may use the utterance recommendation technique to analyze the enriched data.

At block 912, based on the analysis, a preferential rank ordering of the preconfigured potential utterance options to be recommended may be provided by each utterance recommendation technique. In an example, the multi-fold solution recommender 204, on implementing each utterance recommendation technique, may provide the preferential rank ordering of the preconfigured potential utterance options based on the analysis.

At block 914, a plurality of preferential rank orderings of the preconfigured potential utterance options, may be received. The plurality of preferential rank orderings may include the preferential rank ordering of the preconfigured potential utterance options provided by each of the plurality of the utterance recommendation techniques. In an example, the parallel consensus aggregator 206 may receive the plurality of preferential rank orderings of the preconfigured potential utterance options.

At block 916, a single optimized rank ordering of the preconfigured potential utterance options with a minimum final disagreement among the plurality of preferential rank orderings may be determined. The single optimized rank ordering may represent a ranking order of the preconfigured potential utterance options. In an example, the parallel consensus aggregator 206 may determine the single optimized rank ordering of the preconfigured potential utterance options with the minimum final disagreement.

At block 918, the response to the user query may be provided, based on a potential utterance option ranked highest in the single optimized rank ordering. In an example, the parallel consensus aggregator 206 may provide the response to the user query based on the highest ranked potential utterance option.

The method 900 may further include generating, a user profile based on information obtained from at least one of a user's current interactions with a virtual agent and previous recommendations provided to a user. In an example, the data aggregator 130 may generate the user profile.

In accordance with various embodiments of the present disclosure, the plurality of sources include at least one of an external data source, user portfolio data, and user profile data.

The enriched data 904 may be obtained by performing variable correlation analysis to determine an association between the plurality of utterance influencing attributes, determining based on the variable correlation analysis, a variance inflation factor (VIF) score for each of the plurality of utterance influencing attributes, the VIF score for an utterance influencing attribute indicating an extent of variability explainable by a linear combination of other utterance influencing attributes, and collating the plurality of utterance influencing attributes based on corresponding VIF scores to provide the enriched data.

The method 900 may further include identifying a set of potential ranking order permutations, based on a number of preconfigured potential utterance options, the set of the potential ranking order permutations including the plurality of preferential rank orderings, determining a disagreement index between each potential ranking order in the set of potential ranking order permutations with respect to each of the plurality of preferential rank orderings, computing a final disagreement index for each potential ranking order in the set of potential ranking order permutations, based on the disagreement index determined with respect to each of the plurality of preferential rank orderings, and providing the preferential rank ordering with the minimum final disagreement index as the single optimized rank ordering of the preconfigured potential utterance options. Further, determining the disagreement index between each potential ranking order in the set of potential ranking order permutations, may further include determining for each potential ranking order, a pair-wise disagreement index of ranking between each pair of the preconfigured potential utterance options, and computing for each potential ranking order, the disagreement index based on corresponding one or more pair-wise disagreement index.

In an example, the method 900 may be a computer-implemented method. In an example, the method 900 may be practiced using a non-transitory computer-readable medium including machine readable instructions that are executable by a processor to perform the method 900 or to implement the functionality of the system 110.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
   a processor; and
   memory storing executable instructions, which, when executed by the processor cause the system to:
   obtain user information through a current interaction between a virtual agent associated with the system and a user via one or more communication channels, the virtual agent being a digital assistant with automated chat interfaces;
   determine a plurality of utterance influencing attributes influencing a response recommended for user query from a plurality of sources, wherein the plurality of utterance influencing attributes are determined based on the obtained information, a user profile, and data related to external factors;
   select a set of utterance influencing attributes among the plurality of utterance influencing attributes based on correlations among the plurality of utterance influencing attributes and collate the selected set of utterance influencing attributes to provide enriched user data;
   identify a set of preconfigured potential utterance options associated with the user query;
   implement a plurality of utterance recommendation techniques comprising machine learning techniques, deep learning techniques, orthogonal vector based techniques, and collaborative filtering techniques to analyze the enriched user data;
   analyze the enriched data based on predefined rules associated with the utterance recommendation technique;
   based on the analysis, provide a preferential rank ordering of the preconfigured potential utterance options to be recommended;
   receive a plurality of preferential rank orderings of the preconfigured potential utterance options, the plurality of preferential rank orderings including the preferential rank ordering of the preconfigured potential utterance options provided by each of the plurality of the utterance recommendation techniques;
   determine a single optimized rank ordering of the preconfigured potential utterance options by aggregating the plurality of preferential rank orderings provided by the plurality of the utterance recommendation techniques, wherein the aggregation is performed using parallel consensus aggregation with a minimum final dissimilarity in the plurality of preferential rank orderings, the single optimized rank ordering representing a ranking order of the preconfigured potential utterance options; and
   enable the virtual agent to mimic human-like interactions using a potential utterance option ranked highest in the single optimized rank ordering, thereby facilitating dynamic human-like interaction between the virtual agent and the user.

2. The system of claim 1, wherein the processor is to generate the user profile, based on information obtained from at least one of the user's current interactions with the virtual agent and previous recommendations provided to the user.

3. The system of claim 1, wherein the plurality of sources include at least one of an external data source, user portfolio data, and user profile data.

4. The system of claim 1, wherein to provide the enriched data, the processor is to:
   perform variable correlation analysis to determine an association between the plurality of utterance influencing attributes;
   based on the variable correlation analysis, determine a variance inflation factor (VIF) score for each of the plurality of utterance influencing attributes, the VIF score for an utterance influencing attribute indicating an extent of variability explainable by a linear combination of other utterance influencing attributes; and
   collate the plurality of utterance influencing attributes, based on corresponding VIF scores to provide the enriched data.

5. The system of claim 1, wherein the processor is to:
   identify a set of potential ranking order permutations, based on a number of preconfigured potential utterance options, the set of the potential ranking order permutations including the plurality of preferential rank orderings;
   determine a disagreement index between each potential ranking order in the set of potential ranking order permutations with respect to each of the plurality of preferential rank orderings;
   compute a final disagreement index for each potential ranking order in the set of potential ranking order permutations, based on the disagreement index determined with respect to each of the plurality of preferential rank orderings; and provide the preferential rank ordering with the minimum final disagreement index as the single optimized rank ordering of the preconfigured potential utterance options.

6. The system of claim 5, wherein to determine the disagreement index between each potential ranking order in the set of potential ranking order permutations, the processor is to:
   determine, for each potential ranking order, a pair-wise disagreement index of ranking between each pair of the preconfigured potential utterance options; and
   compute, for each potential ranking order, the disagreement index based on corresponding one or more pair-wise disagreement index.

7. The system of claim 5, wherein the processor implements one of an ordinal distance-based approach and a bootstrap approach to determine the single optimized rank ordering of the preconfigured potential utterance options.

8. A method comprising:
   obtaining, by a processor, user information through a current interaction between a virtual agent and a user via one or more communication channels, the virtual agent being a digital assistant with automated chat interfaces;
   determining, by the processor, a plurality of utterance influencing attributes influencing a response recommended for a user query from a plurality of sources, wherein the plurality of utterance influencing attributes are determined based on the obtained information, a user profile, and data related to external factors;
   selecting, by the processor, a set of utterance influencing attributes among the plurality of utterance influencing attributes based on correlations among the plurality of utterance influencing attributes and collating, by the processor, the selected set of utterance influencing attributes to provide enriched user data;
   identifying, by the processor, a set of preconfigured potential utterance options associated with the user query;
   implementing, by the processor, a plurality of utterance recommendation techniques comprising machine learning techniques, deep learning techniques, orthogonal vector based techniques, and collaborative filtering techniques to analyze the enriched user data;
   analyzing, by the processor, the enriched data based on predefined rules associated with an utterance recommendation technique;
   providing, by the processor, based on the analysis, a preferential rank ordering of the preconfigured potential utterance options to be recommended;
   receiving, by the processor, a plurality of preferential rank orderings of the preconfigured potential utterance options, the plurality of preferential rank orderings including the preferential rank ordering of the preconfigured potential utterance options provided by each of the plurality of the utterance recommendation techniques;
   determining, by the processor, a single optimized rank ordering of the preconfigured potential utterance options by aggregating the plurality of preferential rank orderings provided by the plurality of the utterance recommendation techniques, wherein the aggregation is performed using parallel consensus aggregation with a minimum final dissimilarity in the plurality of preferential rank orderings, the single optimized rank ordering representing a ranking order of the preconfigured potential utterance options; and
   enabling, by the processor, the virtual agent to mimic human-like interactions using a potential utterance option ranked highest in the single optimized rank ordering, thereby facilitating dynamic human-like interaction between the virtual agent and the user.

9. The method of claim 8, further comprising generating, by the processor, the user profile, based on information obtained from at least one of the user's current interactions with the virtual agent and previous recommendations provided to the user.

10. The method of claim 8, wherein the plurality of sources include at least one of an external data source, user portfolio data, and user profile data.

11. The method of claim 8, wherein providing the enriched data includes:
   performing, by the processor, variable correlation analysis to determine an association between the plurality of utterance influencing attributes;
   determining, by the processor, based on the variable correlation analysis, a variance inflation factor (VIF) score for each of the plurality of utterance influencing attributes, the VIF score for an utterance influencing attribute indicating an extent of variability explainable by a linear combination of other utterance influencing attributes; and
   collating, by the processor, the plurality of utterance influencing attributes, based on corresponding VIF scores to provide the enriched data.

12. The method of claim 8, further comprising:
   identifying, by the processor, a set of potential ranking order permutations, based on a number of preconfigured potential utterance options, the set of the potential ranking order permutations including the plurality of preferential rank orderings;
   determining, by the processor, a disagreement index between each potential ranking order in the set of potential ranking order permutations with respect to each of the plurality of preferential rank orderings;
   computing, by the processor, a final disagreement index for each potential ranking order in the set of potential ranking order permutations, based on the disagreement index determined with respect to each of the plurality of preferential rank orderings; and
   providing, by the processor, the preferential rank ordering with the minimum final disagreement index as the single optimized rank ordering of the preconfigured potential utterance options.

13. The method of claim 12, wherein determining the disagreement index between each potential ranking order in the set of potential ranking order permutations, further comprises:
   determining, by the processor, for each potential ranking order, a pair-wise disagreement index of ranking between each pair of the preconfigured potential utterance options; and
   computing, by the processor, for each potential ranking order, the disagreement index based on corresponding one or more pair-wise disagreement index.

14. A non-transitory computer readable medium including machine readable instructions that are executable by a processor to:
   obtain user information through a current interaction between a virtual agent and a user via one or more communication channels, the virtual agent being a digital assistant with automated chat interfaces;
   determine a plurality of utterance influencing attributes influencing a response recommended for a user query from a plurality of sources, wherein the plurality of utterance influencing attributes are determined based on the obtained information, a user profile, and data related to external factors;

select a set of utterance influencing attributes among the plurality of utterance influencing attributes based on correlations among the plurality of utterance influencing attributes and collate the selected set of utterance influencing attributes to provide enriched user data;

identify a set of preconfigured potential utterance options associated with the user query;

implement a plurality of utterance recommendation techniques comprising machine learning techniques, deep learning techniques, orthogonal vector based techniques, and collaborative filtering techniques to analyze the enriched user data;

analyze the enriched data based on predefined rules associated with an utterance recommendation technique;

provide based on the analysis, a preferential rank ordering of the preconfigured potential utterance options to be recommended;

receive a plurality of preferential rank orderings of the preconfigured potential utterance options, the plurality of preferential rank orderings including the preferential rank ordering of the preconfigured potential utterance options provided by each of the plurality of the utterance recommendation techniques;

determine a single optimized rank ordering of the preconfigured potential utterance options by aggregating the plurality of preferential rank orderings provided by the plurality of the utterance recommendation techniques, wherein the aggregation is performed using parallel consensus aggregation with a minimum final dissimilarity in the plurality of preferential rank orderings, the single optimized rank ordering representing a ranking order of the preconfigured potential utterance options; and enable the virtual agent to mimic human-like interactions using a potential utterance option ranked highest in the single optimized rank ordering, thereby facilitating dynamic human-like interaction between the virtual agent and the user.

15. The non-transitory computer-readable medium of claim 14, wherein the processor is to generate the user profile, based on information obtained from at least one of the user's current interactions with the virtual agent and previous recommendations provided to the user.

16. The non-transitory computer-readable medium of claim 14, wherein the plurality of sources include at least one of an external data source, user portfolio data, and user profile data.

17. The non-transitory computer-readable medium of claim 14, wherein the processor is to:

perform variable correlation analysis to determine an association between the plurality, of utterance influencing attributes;

determine based on the variable correlation analysis, a variance inflation factor (VIF) score for each of the plurality of utterance influencing attributes, the VIF score for an utterance influencing attribute indicating an extent of variability explainable by a linear combination of oilier utterance influencing attributes; and collate the plurality of utterance influencing attributes, based on corresponding VIF scores to provide the enriched data.

18. The non-transitory computer-readable medium of claim 14, wherein the processor is to:

identify a set of potential ranking order permutations, based on a number of preconfigured potential utterance options, the set of the potential ranking order permutations including the plurality of preferential rank orderings;

determine a disagreement index between each potential ranking order in the set of potential ranking order permutations with respect to each of the plurality of preferential rank orderings;

compute a final disagreement index for each potential ranking order in the set of potential ranking order permutations, based on the disagreement index determined with respect to each of the plurality of preferential rank orderings; and provide the preferential rank ordering with the minimum final disagreement index as the single optimized rank ordering of the preconfigured potential utterance options.

19. The non-transitory computer-readable medium of claim 18, wherein to determine the disagreement index between each potential ranking order in the set of potential ranking order permutations, the processor is to:

determine for each potential ranking order, a pair-wise disagreement index of ranking between each pair of the preconfigured potential utterance options; and compute for each potential ranking order, the disagreement index based on corresponding one or more pair-wise disagreement index.

\* \* \* \* \*